United States Patent [19]

Gaul

[11] Patent Number: 4,761,169
[45] Date of Patent: Aug. 2, 1988

[54] CORROSION RESISTANT COBALT-BASE ALLOY CONTAINING HAFNIUM AND A HIGH PROPORTION OF CHROMIUM AND METHOD OF MAKING FIBERS

[75] Inventor: David J. Gaul, Newark, Ohio

[73] Assignee: Owens-Corning Fiberglas Corporation, Toledo, Ohio

[21] Appl. No.: 914,951

[22] Filed: Oct. 3, 1986

Related U.S. Application Data

[63] Continuation-in-part of Ser. No. 824,682, Jan. 23, 1986, abandoned, which is a continuation-in-part of Ser. No. 746,158, Jun. 18, 1985, abandoned.

[51] Int. Cl.$^4$ ............................................. C03B 37/04
[52] U.S. Cl. ............................................. 65/8; 65/15;
65/374.12; 420/436; 420/437; 420/438;
420/439; 420/440; 420/586; 420/588
[58] Field of Search ............... 420/436, 437, 438, 439,
420/440, 586, 588; 165/8, 15, 374.12; 148/408,
419, 425, 442

[56] References Cited

U.S. PATENT DOCUMENTS 4,618,474 10/1986 Ohe et al. ............................... 420/436

Primary Examiner—R. Dean
Attorney, Agent, or Firm—Patrick P. Pacella; Robert F. Rywalski

[57] ABSTRACT

An alloy suitable for use as a spinner in forming glass fibers, the alloy being cobalt-based and including the following elements in percent by weight: chromium—about 34.0 to about 38.0; nickel—about 10.0 to about 15.0; wolfram—about 4.0 to about 7.0; tantalum—about 2.0 to about 5.0; zirconium—about 0.1 to about 0.4: silicon—present but about 0.15 max; carbon—about 0.65 to about 0.95; boron—about 0.005 to about 0.02; hafnium—about 0.4 to about 1.0; aluminum—0.0 to about 0.2; titanium—0.0 to about 0.2; manganese—0.0 to about 0.5; molybdenum—0.0 toabout 0.1; iron—0.0 to about 2.0; and cobalt—balance; and further that:

$$32 \geq \% \text{Cr} - 3.5[\% \text{C} - (\% \text{Ta} + \% \text{Zr} + \% \text{Hf} + \% \text{Ti})], \quad (1)$$

and $$2.74 \geq 4.66\left(\frac{\% \text{Cr}}{100}\right) + 0.61\left(\frac{\% \text{Ni}}{100}\right) + \\ 1.71\left(\frac{\% \text{Co}}{100}\right) + 4.66\left(\frac{\% \text{W}}{100}\right) + 2.22\left(\frac{\% \text{Fe}}{100}\right) + \\ 4.66\left(\frac{\% \text{Mo}}{100}\right) + 6.66\left(\frac{\% \text{Si}}{100}\right) + 6.66\left(\frac{\% \text{Ti}}{100}\right) + \\ 7.66\left(\frac{\% \text{Al}}{100}\right) + 3.66\left(\frac{\% \text{Mn}}{100}\right) \quad (2)$$

said percents of the elements in equation Nos. 1 and 2 each being atom percent.

15 Claims, 1 Drawing Sheet

CORROSION RESISTANT COBALT-BASE ALLOY CONTAINING HAFNIUM AND A HIGH PROPORTION OF CHROMIUM AND METHOD OF MAKING FIBERS

CROSS-REFERENCES TO RELATED APPLICATIONS

This is a continuation-in-part application of copending application Ser. No. 824,682 filed Jan. 23, 1986, abandoned which is a continuation-in-part application of copending application Ser. No. 746,158 filed June 18, 1985 (now abandoned), each of said applications being incorporated herein by reference in its entirety.

BACKGROUND OF THE INVENTION

This invention relates to improved cobalt-base alloys containing hafnium and a high proportion of chromium which are particularly suitable for high-temperature molten glass enviroments.

In one of its more specific aspects, the invention relates to articles manufactured from the alloys, particularly articles made by casting.

In certain industrial applications there is a need for alloys which possess high rupture strength, high hot corrosion and high oxidation resistance at high temperatures. Among such applications are those involved, for example, in the glass fiber industry, where filaments are produced by passing a molten mineral material, for example, glass, through the foraminous walls of a chamber adapted for rotation at high speeds, the chamber being known as a spinner, the filaments being emitted through fiberizing orifices of the walls due to the centrifugal action to which the molten material is subjected upon rotation of the spinner. Such spinners are typically operated when spinning glass fibers at temperatures of about 2050° F. and rotation speeds of about 2050 RPM. It is advantageous, from a production cost standpoint, for the rotation speed to be as high as possible to increase the rate at which filaments are emitted through the fiberizing orifices. However, high spinner rotational speeds result in a reduction in spinner life due to the limited strength and corrosion resistance of the prior art alloys used in spinners. Also, cost savings are realized by fiberizing lower cost batch formulations such as higher viscosity wool glass, but prior art alloys have not had the necessary mechanical strength to fiberize at the higher temperatures required for higher viscosity wool glass. The stress rupture properties of prior art alloys fall off rapidly above 2100° F.

Conventional commercial materials, prior to the present invention, for use in such applications are those defined and claimed in U.S. Pat. No. 3,933,484 issued Jan. 20, 1976 and U.S. Pat. No. 4,497,771 issued Feb. 5, 1985, the alloy composition of U.S. Pat. No. 4,497,771 being substantially the same as that of U.S. Pat. No. 3,933,484 except that the alloy composition of U.S. Pat. No. 4,497,771 has a lower tantalum content.

The alloy compositions of the present invention have substantially improved strength and corrosion resistance compared with the alloy compositions disclosed in U.S. Pat. Nos. 3,933,484 and 4,497,771.

STATEMENT OF THE INVENTION

Accordingly, an object of this invention is to provide a hafnium and high chromium content cobalt-base alloy having superior strength at high temperatures and superior corrosion resistance, an alloy which can be vacuum-investment cast and which is particularly resistant to corrosion by molten glass.

According to this invention there is provided a cobalt-base alloy containing chromium, nickel, wolfram, tantalum, zirconium, silicon, carbon, boron and hafnium. The composition may include typical impurity elements such as, for example, aluminum, titanium, manganese, molybdenum and iron in essentially impurity amounts. The alloys of the present invention possess the following approximate composition, the various components of this composition being expressed herein on a weight percent basis:

| Element | Approximate Composition, Weight % |
|---|---|
| Chromium | About 34.0 to about 38.0 |
| Nickel | About 10.0 to about 15.0 |
| Wolfram | About 4.0 to about 7.0 |
| Tantalum | About 2.0 to about 5.0 |
| Zirconium | About 0.1 to about 0.4 |
| Silicon | Present but about 0.15 max. |
| Carbon | About 0.65 to about 0.95 |
| Boron | About 0.005 to about 0.02 |
| Hafnium | About 0.4 to about 1.0 |
| Aluminum | 0.0 to about 0.2 |
| Titanium | 0.0 to about 0.2 |
| Manganese | 0.0 to about 0.05 |
| Molybdenum | 0.0 to about 0.1 |
| Iron | 0.0 to about 2.0 |
| Cobalt | Balance | and further that:

$$32 \geq \% \text{Cr} - 3.5[\% \text{C} - (\% \text{Ta} + \% \text{Zr} + \% \text{Hf} + \% \text{Ti})], \quad (1)$$

and $$2.74 \geq 4.66\left(\frac{\% \text{Cr}}{100}\right) + 0.61\left(\frac{\% \text{Ni}}{100}\right) + 1.71\left(\frac{\% \text{Co}}{100}\right) + 4.66\left(\frac{\% \text{W}}{100}\right) + 2.22\left(\frac{\% \text{Fe}}{100}\right) + 4.66\left(\frac{\% \text{Mo}}{100}\right) + 6.66\left(\frac{\% \text{Si}}{100}\right) + 6.66\left(\frac{\% \text{Ti}}{100}\right) + 7.66\left(\frac{\% \text{Al}}{100}\right) + 3.66\left(\frac{\% \text{Mn}}{100}\right) \quad (2)$$

said percents of the elements in equation Nos. 1 and 2 each being atom percent.

The percentages of the elements in Equation No. 2 represent the concentration of those elements in the matrix of the alloy. These percentages are calculated by subtracting from the bulk concentration of the elements, the percentages of the elements tied up in carbides or other second phases and normalizing the remaining percentages to total 100%. The normalized percentages represent the matrix composition of the alloy.

The weight percent of an element (X) may be converted to the equivalent atom percent of the element using the following formula:

$$\text{Atom Percent of } X = \frac{100 \, (\text{Weight Percent of } X/Z_x)}{\sum_{i=1}^{n} (X_i/Z_i)} \quad (3)$$

wherein Z is the atomic weight of the element and n is the number of elements in the composition. Similarly, the atom percent of an element (Y) may be converted to the equivalent weight percent of the element using the following formula:

$$\text{Weight percent of } Y = \frac{100 \text{ (Atom Percent of } Y)(Z_y)}{\sum_{i=1}^{n} Y_i(Z_i)} \quad (4)$$

wherein Z is the atomic weight of the element and n is the number of elements in the composition.

Silicon is present in the alloy up to a maximum of 0.15%, as indicated above. Usually the silicon content of the alloy ranges between 0.05 and 0.1%, but satisfactory compositions have been produced with 0.01% silicon.

The alloy compositions of this invention may include, impurities, in addition to aluminum, titanium, manganese, molybdenum and iron. However, these additional impurities, if present, should be limited to about 0.005 weight percent sulfur and 0.005 weight percent phosphorous. Also, the nitrogen and oxygen gas levels in the compositions should be limited to a maximum of 150 ppm and 20 ppm, respectively.

The preferred composition of this invention is approximately as follows, on a weight percent basis:

| Element | Approximate Composition, Weight % |
|---|---|
| Chromium | About 35.0 to about 36.0 |
| Nickel | About 10.7 to about 11.3 |
| Wolfram | About 5.5 to about 6.1 |
| Tantalum | About 2.2 to about 2.8 |
| Zirconium | About 0.17 to about 0.23 |
| Silicon | Present but about 0.13 max. |
| Carbon | About 0.70 to about 0.78 |
| Boron | About 0.008 to about 0.012 |
| Hafnium | About 0.60 to about 0.90 |
| Aluminum | 0.0 to about 0.2 |
| Titanium | 0.0 to about 0.2 |
| Manganese | 0.0 to about 0.01 |
| Molybdenum | 0.0 to about 0.1 |
| Iron | 0.0 to about 1.0 |
| Cobalt | Balance |

In the above composition, the weight ratio of wolfram to tantalum is within the range of from about 2 to about 2.8, and the weight ratio of zirconium to boron is within the range of from about 14 to about 29.

The best mode of practicing the invention is representing by the following approximate composition on a weight percent basis:

| Element | Approximate Composition, Weight % |
|---|---|
| Chromium | About 35.5 |
| Nickel | About 11.0 |
| Wolfram | About 5.8 |
| Tantalum | About 2.5 |
| Zirconium | About 0.20 |
| Silicon | About 0.10 |
| Carbon | About 0.74 |
| Boron | About 0.01 |
| Hafnium | About 0.7 |
| Aluminum | 0.0 to about 0.2 |
| Titanium | 0.0 to about 0.2 |
| Manganese | 0.0 to about 0.01 |
| Molybdenum | 0.0 to about 0.1 |
| Iron | 0.0 to about 1.0 |
| Cobalt | Balance |

In the above composition, the weight ratio of wolfram to tantalum is about 2.3, and the weight ratio of zirconium to boron is about 20.

Comparing the alloy compositions of the present invention with the alloy compositions disclosed and claimed in U.S. Pat. Nos. 3,933,484 and 4,497,771, the alloy compositions of the present invention: have a higher tantalum content, which results in the formation of more MC carbides (where M are suitable carbide formers, as for example, zirconium and tantalum) enhancing the strength of the alloys; have a higher zirconium content to also form more MC carbides which partition to the grain boundaries reducing grain boundary sliding and thereby enhancing the strength of the alloys; have a higher chromium content to substantially improve glass corrosion resistance; and contain hafnium which, like the tantalum, enhances the strength of the alloys and, in addition, substantially reduces the glass corrosion rate of the alloys. Stronger alloy castings are produced using vacuum-casting techniques rather than air-casting techniques provided that the silicon content of the alloys is maintained low. Accordingly, the silicon content of the alloys of the present invention is relatively low to permit the formation of higher strength castings by vacuum-casting techniques.

Comparing the alloy compositions of the present invention with the alloy compositions disclosed and claimed in copending parent application Ser. No. 746,158 filed June 18, 1985, the alloy compositions of the present invention are more resistant to the formation of a sigma phase, which causes embrittlement of the alloy at high temperatures, e.g. 1500°-1700° F., even though there may not be a significant problem at higher temperatures. A problem of spinners comprising some of such alloy compositions has been that when the spinners or portions thereof are operated in the temperature range of 1500°-1700° F. the portions of the spinners operated in that temperature range tend to become brittle and cracks may form. This is believed due to the fact that the sigma phase is precipitated in the alloys on casting and when operating in the 1500°-1700° F. range causing the hardness of the alloys to increase substantially and the ductility of the alloys to decrease substantially.

Spinners comprising the improved alloys of the present invention are phase stable throughout that operating temperature range and higher without loss of impact strength or ductility of the alloy. Reliability and longevity of spinners comprising the alloys of the present invention are substantially improved.

BRIEF DESCRIPTION OF THE DRAWINGS

The features and advantages of the present invention will become more clearly appreciated from the following description taken in conjunction with the accompanying drawings in which.

DETAILED DESCRIPTION OF THE INVENTION

Figure 1:
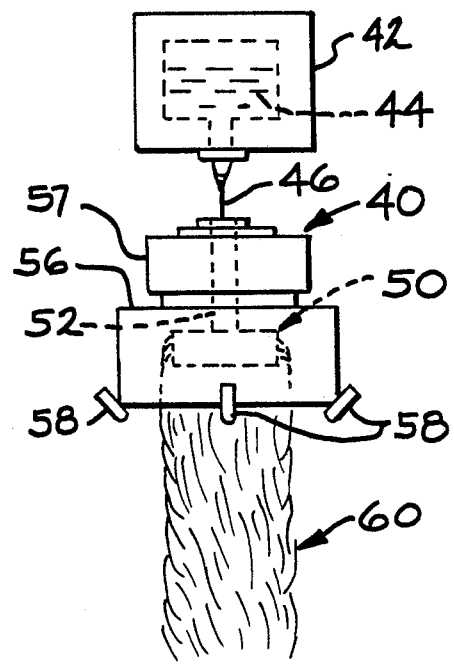
FIG. 1 is a semi-schematic, front elevational view of a rotary fiber-forming system for producing glass wool.

The compositions of this invention can be prepared by vacuum-melting and vacuum-casting according to recognized melt procedures for cobalt-base alloys, sometimes known as superalloys.

In the preferred method of producing the alloys, the original melt formed in the crucible will consist principally of chromium and cobalt. Thereafter, the remainder of the elements required can be introduced into the original melt in any order when the melt temperature is within the range from about 2700° F. to about 2800° F. As an alternate, however, all components of the composition can be introduced into the crucible with the cobalt and chromium. Inasmuch as zirconium and boron are contained in the composition in minimal amounts and certain weight ratios have been indicated desirable, it is preferred that the zirconium, boron and tantalum be introduced into the melt immediately prior to pouring in order to prevent either the oxidation of these latter materials or their loss from the crucible. Hafnium is added last to minimize oxidation and volatilization. After the addition of these latter materials, the melt is heated to a temperature within the range of from about 2800° F. to about 3025° F. to produce a uniform composition. The temperature of the melt is reduced to 2600° F. to 2750° F. and poured into a heated investment mold. The mold temperature is between 1600° F. and 1900° F. with 1800° F. being optimum. The investment mold is produced by the lost wax process. A wax pattern of the casting is invested in a series of ceramic slurries which are cured. The wax is removed in a steam autoclave and the finished mold is heated in a suitable high-temperature furnace. Preferably, the resulting cast alloy is heated at 2000° F. for 3 hours and air-cooled.

Castings made from the alloys of the present invention are produced by the vacuum investment cast process which allows the introduction of the reactive element, hafnium, and the introduction of higher levels of other reactive elements such as zirconium and tantalum than can be used with the prior art alloys of U.S. Pat. No. 3,933,484. The vacuum investment cast process is described in *The Superalloys* by Sims and Hagel, John Wiley & Sons, Inc., 1972, pages 383–391 and 403–425. Castings of the prior art alloys are produced via an air-melt process requiring the presence of a high level of silicon in the alloys to increase the fluidity of the melt. Fluidity is not a problem with the vacuum investment cast process, and therefore the silicon content in the alloys of the present invention is kept at a low level. Furthermore, the use of high silicon content alloys in vacuum investment cast processes should be avoided as castings formed by this process are susceptible to a defect known as shrinkage porosity. The presence of high amounts of silicon in the alloys increases the freezing range of the alloys giving rise to casting integrity problems. One of the benefits of using the vacuum investment cast process is the ability to produce near net shape castings. The alloys of the present invention are ideal for vacuum investment cast processes compared with the prior art alloys containing a high silicon content.

Even if a good quality casting of a prior art alloy of U.S. Pat. No. 3,833,484 is made by the vacuum investment cast process, the casting will not possess the mechanical performance of the alloys of the present invention. For example, a casting consisting of a prior art alloy of U.S. Pat. No. 3,933,484 may have a rupture life of only 31 hours compared with the same alloy which has been subjected to a vacuum melting process which may have a rupture life of 93 hours. However, even though the rupture life is increased by the vacuum melting process, the creep rate is too high for dimensional stability. The creep rate may increase from $6.8 \times 10^{-4}$ in./in./hr. to $3.7 \times 10^{-3}$ in./in./hr. at 2100° F. and 3000 psi. Thus, the mechanical performance of the prior art alloys even when subjected to a vacuum investment cast process is not as good as the alloys of the present invention when subjected to the vacuum investment cast process.

The cobalt-base alloys of the present invention are more stable at temperatures in the range of 1500° F. to 1700° F. than the alloys disclosed and claimed in applicant's copending application Ser. No. 746,158 and continuation application Ser. No. 827,135 filed Feb. 7, 1986. This stability is attributable to the fact that the alloy matrix is primarily in the preferred gamma phase. The formation of undesirable phases, and particularly the sigma phase, at these temperatures is avoided. The sigma phase has a composition which can be approximated as $(Co,Ni)_x(W,Cr)_y$. This phase forms if the chromium content is above a predetermined level. The alloys of the present invention maintain a high chromium content close to the gamma phase boundary, which is necessary for glass corrosion resistance, while at the same time the chromium content is maintained low enough to avoid formation of the sigma phase. Sigma phase formation is prevented by (1) increasing the nickel concent to stabilize the matrix and (2) removing chromium from the matrix as a carbide by reducing the tantalum and zirconium content and increasing the carbon content. This has been accomplished without loss of stress rupture performance.

The composition of the gamma phase stable alloys of the present invention is defined by a "Phacomp" computation, the theory and calculations of which are described generally in *The Superalloys*, supra, pages 259–284. "Phacomp" is an acronym for "phase computation". This computation serves to define the concentration limits of the various components of phase stable austenitic alloys. Phacomp computations are based on the electron hole theory. The electron hole number for each element is based on the number of electrons needed to fill the third orbital in combination with the amount of pairing that occurs.

A Phacomp number is determined for the cobalt-base alloy, the number being an indicator of the stability of the gamma phase. The lower the number, the more stable the gamma phase. It has been determined that for cobalt-base alloys the critical Phacomp number is 2.74 (the first number appearing in equation No. 2), above which the alloy composition will develop several undesirable phases, most notably the sigma phase, which result in an unstable alloy.

Sigma is known as an electron compound, and therefore the formation of sigma increases as the electron hole number, and accordingly the Phacomp number, increases. Consequently, it is essential for the cobalt-base alloys of the present invention that the alloys contain elements in the gamma phase, or matrix, with low electron hole numbers. Different elements of the alloy have a greater or lesser effect on the Phacomp number. Chromium and tungsten, for example, have the most adverse effect by increasing the Phacomp number. Thus, the matrix content of chromium and tungsten in the alloys is maintained as low as possible to gain a more stable alloy composition, but chromium levels must be high for corrosion resistance.

Referring to equation No. 1 above, it has been determined that the chromium in the cobalt-base alloys, because of its affect on alloy stability and glass corrosion resistance, must be no more than 32 a/o (note: atom percent is indicated "a/o" and weight percent is indicated "%") in the alloy matrix. A chromium content of more than 32 a/o will substantially reduce the stability of the alloy. Since chromium is in both the matrix and in carbides, the total chromium content of the alloy will depend upon the amount of carbide-forming elements present. Thus:

Maximum Cr content = 32 a/o + Cr in $M_{23}C_6$ carbides. (5)

For calculation purposes, the formula for $M_{23}C_6$ carbide is $Cr_{21}W_2C_6$. Thus, the Cr-to-C ratio in the carbide is 21/6, or 3.5. Substituting in equation No. 5 we obtain:

Maximum Cr = 32 a/o + (C in $M_{23}C_6$) × 3.5 (6)

All of the carbon is in two forms, MC or $M_{23}C_6$. The total carbon content is limited to 0.95% or 4.5 a/o to avoid problems with casting and handling of the alloy. To maximize the chromium content the amount of carbon tied up in the MC carbides must first be calculated:

$C_{inMC}$ = Ta + Hf + Ti + Zr = 1.52 a/o (7)

The hafnium range is selected for corrosion resistance and therefore cannot cover a very broad range. The atom percent of hafnium, tantalum, titanium and zirconium can float as long as the combined total is less than or equal to 1.52. This number may be higher only if there is excess carbon available and if the chromium is below 32 a/o. The MC carbide information must be substituted to determine the carbon available for the $M_{23}C_6$ carbides:

Maximum $C_{M_{23}C_6}$ = 4.5 − 1.52 = 2.98 a/o of C (8)

Since the chromium-to-carbon ratio if the $M_{23}C_6$ carbide is 3.5, then 10.43 a/o of the chromium is tied up in the carbides. This value is substituted into equation No. 5 yielding:

Maximum Cr = 32 + 10.43 = 42.43 a/o = 38% (9)

Thus, 38% (weight) chromium can be used in the alloy with the composition being phase stable.

If the above equations are combined, one can see the dependence that the elements have on one another:

32 ≥ a/oCr − 3.5[a/oC − (a/oTa + a/oZr + a/oHf + a/oTi)] (10)

It is important to note that this equation only defines the relationship that the major carbide formers have with each other. A second equation is needed to further define the alloy. As stated earlier, the prime objective of the Phacomp computation is to obtain the matrix composition of the alloy. A Phacomp number, which is a measure of alloy stability, is obtained from the following equation:

$$\overline{N}_v = \sum_{i=1}^{n} m_i(N_v)_i \quad (11)$$

where $\overline{N}_v$ is the average electron hole number, or Phacomp number, for the alloy, $m_i$ is the atomic fraction of that particular element, $N_v$ is the individual electron-hole number of a particular element, and n is the number of elements in the matrix. In the case of the alloys of the present invention, $\overline{N}_v$ must be less than or equal to 2.74. Therefore, an equation governing the possible alloy compositions is:

$$2.74 \geq 4.66 \left( \frac{\% Cr}{100} \right) + 0.61 \left( \frac{\% Ni}{100} \right) + 1.71 \left( \frac{\% Co}{100} \right) + \quad (12)$$

$$4.66 \left( \frac{\% W}{100} \right) + 2.22 \left( \frac{\% Fe}{100} \right) + 4.66 \left( \frac{\% Mo}{100} \right) +$$

$$6.66 \left( \frac{\% Si}{100} \right) + 6.66 \left( \frac{\% Ti}{100} \right) + 7.66 \left( \frac{\% Al}{100} \right) +$$

$$3.66 \left( \frac{\% Mn}{100} \right)$$

where the different elemental values are given as the atom percent in the matrix.

The combination of equation Nos. 10 and 12 define the possible variations in applicant's alloy composition. Of course, equation Nos. 3 and 4 above are required to convert from weight percent to atom percent and vice versa.

As previously indicated, alloys of this invention are particularly suited for use in manufacture of spinners. A combination of stress rupture and metal corrosion by molten glass limit the service life of spinners in operation.

Figure 2:
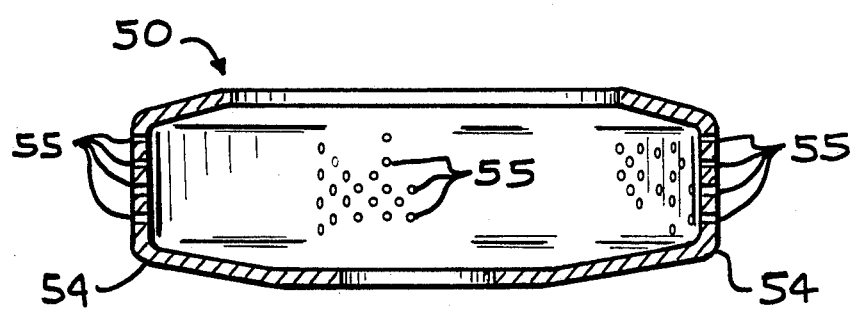
FIG. 2 is an enlarged cross-sectional view of the spinner shown in FIG. 1.

Referring to FIGS. 1 and 2, in which like numerals represent like parts, there is shown a rotary or centrifugal fiber-forming system including a rotor or spinner 50 fabricated in its entirety of the alloy of this invention.

As shown in FIG. 1, rotary or centrifugal fiber-forming system 40 is comprised of a flow means or channel 42 having a body of molten inorganic material 43, such as glass, therein. A stream of molten glass 46 is supplied to the rotor or spinner 50 from channel 42, as is known in the art.

Spinner 50 (shown in detail in FIG. 2), which is adapted to be rotated at high speeds, is comprised of a quill 52 and a circumferential stream-defining or working wall 54 having a plurality of orifices or apertures 55 therethrough to supply a plurality of pre-filament or primary streams of molten and inorganic material, such as glass, to be fiberized. After forming the body of the rotor by any suitable process, such as casting, thousands of holes are formed in the circumferential wall.

In conjunction with rotor 50, a shroud 56 and circumferential blower or fluid attenuation means 57 are adapted to assist in the attenuation of the streams of molten material into fibers or filaments 60. A binder material or coating may be applied to the fibers 60 by means of binder applicators 58 as is known in the art. The fibers then may be collected as a pack or mat to produce "wool" type glass fiber insulation.

The following example demonstrates the improved properties of the alloys of the present invention as compared with those alloys defined in U.S. Pat. No. 3,933,484. Tests were conducted to compare the relative strengths and corrosion resistances of an alloy of the present invention with a prior art alloy of U.S. Pat. No. 3,933,484.

The alloy of the present invention had the following composition on a weight percent basis:

| | |
|---|---|
| Chromium | About 35.5 |
| Nickel | About 11.0 |
| Wolfram | About 5.8 |
| Tantalum | About 2.5 |
| Zirconium | About 0.20 |
| Silicon | About 0.10 |
| Carbon | About 0.74 |
| Boron | About 0.01 |
| Hafnium | About 0.7 |
| Aluminum | About 0.11 |
| Titanium | About 0.14 |
| Manganese | About 0.01 |
| Molybdenum | About 0.05 |
| Iron | About 0.14 |
| Cobalt | Balance |

The prior art alloy, which was hafnium free, contained the following on a weight percent basis:

| | |
|---|---|
| Chromium | About 31.2 |
| Nickel | About 11.7 |
| Wolfram | About 7.4 |
| Tantalum | About 1.8 |
| Zirconium | About 0.025 |
| Silicon | About 0.63 |
| Carbon | About 0.59 |
| Boron | About 0.038 |
| Aluminum | About 0.02 |
| Titanium | About 0.025 |
| Manganese | About 0.012 |
| Molybdenum | About 0.3 |
| Iron | About 1.13 |
| Cobalt | Balance |

Both the alloy of the present invention and the prior art alloy were heat-treated at 2000° F. for 3 hours and then air-cooled.

The following exemplifies the application of equation Nos. 1 and 2 to the above alloys of the present invention and prior art.

Considering first the alloy of the present invention, the alloy composition must be expressed as atomic percent (a/o) rather than weight percent:

| Element | Atomic Percent (a/o) |
|---|---|
| Cr | 39.51 |
| Ni | 10.85 |
| W | 1.82 |
| Ta | 0.80 |
| Zr | 0.13 |
| Si | 0.21 |
| C | 3.57 |
| B | 0.05 |
| Hf | 0.23 |
| Al | 0.24 |
| Ti | 0.17 |
| Mo | 0.03 |
| Mn | 0.01 |
| Fe | 0.15 |
| Co | 42.21 |

Equation No. 1 is satisfied using the above atomic percent figures:

$$32 \geq 39.51 - 3.5[3.57 - (0.80 + 0.13 + 0.23 + 0.17)]32 \geq 31.67$$

As stated above cobalt-base alloys of the type with which the present invention is concerned comprise a combination of the matrix and second phases. In order to apply equation No. 2, the amount of second phases must be first determined before the composition of the matrix can be determined. The second phases are carbides of the nature MC and $M_{23}C_6$, the latter in this case obviously being $Cr_{21}(W,Mo)_2C_6$. The M of MC thus becomes 1.33 which is the sum of the atom percent of Hf, Ta, Zr and Ti. Up to one-half of the total C can be used to form MC carbides. To form the MC carbides, an amount of C equivalent to the total of the Hf, Ta, Zr and Ti, 1.33 a/o, is used leaving 2.24 a/o C (3.57−1.33) to form $Cr_{21}(W,Mo)_2C_6$. The amount of Cr tied up in $Cr_{21}(W,Mo)_2C_6$ is 2.24×(21/6), or 7.84 a/o. This leaves 31.67 a/o Cr in the matrix (39.51−7.84). Both W and Mo are also used in the $M_{23}C_6$ carbide in amounts equivalent to their relative atom percents (W/Mo ratio=1.82/0.03). The amount of W tied up in $Cr_{21}(W, Mo)_2C_6$ is $$2.24 \times (2/6) \times \left( \frac{1.82}{1.82 + .03} \right),$$

or 0.73 a/o. This leaves 1.09 a/o W (1.82−0.73) in the matrix. The amount of Mo tied up in $M_{23}C_6$ carbides equals $$2.24 \times (2/6) \times \left( \frac{0.3}{1.82 + .03} \right),$$

or 0.01 a/o, leaving 0.02 a/o (0.03−0.01) in the matrix. The total atomic percent of elements tied up in the second phases is 13.48 a/o [1.33 a/o for M in MC, 3.57 a/o for total C, 7.84 a/o for Cr in $Cr_{21}(W,Mo)_2C_6$, 0.73 a/o for W in $Cr_{21}(W,Mo)_2C_6$ and 0.01 a/o for Mo in $Cr_{21}(W, Mo)_2C_6$]. Thus, the matrix is 86.52 a/o of the alloy which when normalized to a 100 a/o basis results in a multiplying factor of 1.156. Thus, the concentrations of the elements remaining for the matrix must be multiplied by this factor:

Cr=31.67(1.156)=36.61
Ni=10.85(1.156)=12.54
W=1.09(1.156)=1.26
Si=0.21(1.156)=0.24
Ti=0.0(1.156)=0.0
Mo=0.2(1.156)=0.023
Fe=0.15(1.156)=0.17
Mn=0.01(1.156)=0.011
Al=0.24(1.156)=0.28
Co=42.21(1.156)=48.79

Equation No. 2 is satisfied as follows:

$$2.74 \geq [4.66(.3661) + 0.61(.1254) + 4.66(.0126) +$$
$$1.71(.4879) + 6.66(.0024) + 6.66(0.0) + 4.66(.00023) +$$
$$2.22(.0017) + 3.66(.00011) + 7.66(.0028)]$$
$$2.74 \geq 2.718$$

With regard to the prior art alloy, its composition on an atom percent basis is as follows:

| Element | Atom Percent a/o |
|---|---|
| Cr | 34.97 |
| Ni | 11.62 |
| W | 2.35 |
| Ta | .58 |
| Zr | .02 |
| Si | 1.31 |
| C | 2.86 |

-continued

| Element | Atom Percent a/o |
|---------|------------------|
| B | .20 |
| Al | .04 |
| Ti | .02 |
| Mn | .01 |
| Mo | .182 |
| Fe | 1.18 |
| Co | 44.65 |

Equation No. 1 is satisfied using the above atomic percent figures:

$$32 \geq 34.97 - 3.5[2.86 - (0.58 + 0.02 + 0.02 + 0.02)]$$

$$32 \geq 27.13$$

Equation No. 2 is satisfied as follows:

$$2.74 \geq 4.66(0.3088) + 0.61(0.1162) + 1.71(0.4465) +$$

$$4.66(0.0166) + 2.22(0.0118) + 4.66(0.00132) +$$

$$6.66(0.0131) + 7.66(0.0004) + 3.66(0.0001)$$

$$2.74 \geq 2.47$$

The relative strengths of the above alloys of the present invention and prior art were determined by a standard stress-rupture test (American National Standard/ASTM E-139-70 (reapproved 1978)). Average stress rupture performance under the conditions set forth demonstrates the markedly improved average life of the alloy of the present invention compared with the prior art alloy:

| | Test Conditions | | Average Life (Hours) | Average Creep Rate (in./in./hr.) |
|---|---|---|---|---|
| | Temp. (°F.) | Pressure (psi) | | |
| Alloy of present invention | 2100 | 3000 | 274.0 | $1.3 \times 10^{-4}$ |
| Prior art alloy | 2100 | 3000 | 31-32 | $6.8 \times 10^{-4}$ |

The relative corrosion rates of the alloys were determined by a spinner coupon test. In this test holes are countersunk into the top inside of the spinner face of a spinner of the type described above which is cast from one of the two alloys. Samples or coupons composed of the other alloy are press-fit into the holes after which the spinner blanks are drilled. Thus, the samples or coupons become an integral part of the spinner wall, and a direct comparison can be made between the alloy of the present invention and the prior art alloy under identical process conditions.

The compositions of the prior art alloy and the alloy of the present invention were the same as in the above-described stress-rupture test. The following test data demonstrates under a variety of test conditions that the average corrosion rate of the alloy of the present invention containing hafnium and a higher proportion of chromium is substantially lower than the average corrosion rate of the prior art alloy:

| Alloy | Corrosion Rate (mil/200 hr.) |
|-------|------------------------------|
| Alloy of the present invention | 8.89 |
| Prior art alloy | 12.70 |
| Alloy of present invention | 7.20 |
| Prior art alloy | 10.17 |

The above comparative stress-rupture and corrosion data demonstrate that the alloys of the present invention have a markedly improved average life and corrosion rate compared with the prior art alloys.

It will be evident from the foregoing that various modifications can be made to this invention; such, however, are within the scope of the invention.

I claim:

1. As a composition of matter of glass corrosion resistant, high-strength alloy consisting essentially of the following elements in approximate amounts expressed in weight percent:

| Element | Approximate Composition, Weight % |
|---------|-----------------------------------|
| Chromium | About 34.0 to about 38.0 |
| Nickel | About 10.0 to about 15.0 |
| Wolfram | About 4.0 to about 7.0 |
| Tantalum | About 2.0 to about 5.0 |
| Zirconium | About 0.1 to about 0.4 |
| Silicon | Present but about 0.15 max. |
| Carbon | About 0.65 to about 0.95 |
| Boron | About 0.005 to about 0.02 |
| Hafnium | About 0.4 to about 1.0 |
| Aluminum | 0.0 to about 0.2 |
| Titanium | 0.0 to about 0.2 |
| Manganese | 0.0 to about 0.05 |
| Molybdenum | 0.0 to about 0.1 |
| Iron | 0.0 to about 2.0 |
| Cobalt | Balance | and further that:

$$32 \geq \% \text{Cr} - 3.5[\% \text{C} - (\% \text{Ta} + \% \text{Zr} + \% \text{Hf} + \% \text{Ti})] \quad (1)$$

and $$2.74 \geq 4.66\left(\frac{\% \text{Cr}}{100}\right) + 0.61\left(\frac{\% \text{Ni}}{100}\right) + \quad (2)$$

$$1.71\left(\frac{\% \text{Co}}{100}\right) + 4.66\left(\frac{\% \text{W}}{100}\right) + 2.22\left(\frac{\% \text{Fe}}{100}\right) +$$

$$4.66\left(\frac{\% \text{Mo}}{100}\right) + 6.66\left(\frac{\% \text{Si}}{100}\right) + 6.66\left(\frac{\% \text{Ti}}{100}\right) +$$

$$7.66\left(\frac{\% \text{Al}}{100}\right) + 3.66\left(\frac{\% \text{Mn}}{100}\right)$$

said percents of the elements in equation Nos. 1 and 2 each being atom percent.

2. The composition of claim 1 in which said elements are contained in the following approximate amounts expressed in weight percent:

| Element | Approximate Composition, Weight % |
|---------|-----------------------------------|
| Chromium | About 35.0 to about 36.0 |
| Nickel | About 10.7 to about 11.3 |
| Wolfram | About 5.5 to about 6.1 |

-continued

| Element | Approximate Composition, Weight % |
| --- | --- |
| Tantalum | About 2.2 to about 2.8 |
| Zirconium | About 0.17 to about 0.23 |
| Silicon | Present but about 0.13 max. |
| Carbon | About 0.70 to about 0.78 |
| Boron | About 0.008 to about 0.012 |
| Hafnium | About 0.60 to about 0.90 |
| Aluminum | 0.0 to about 0.2 |
| Titanium | 0.0 to about 0.2 |
| Manganese | 0.0 to about 0.01 |
| Molybdenum | 0.0 to about 0.1 |
| Iron | 0.0 to about 1.0 |
| Cobalt | Balance | the weight ratio of wolfram to tantalum being within the range of from about 2 to about 2.8, and the weight ratio of zirconium to boron being within the range of from about 14 to about 29.

3. The composition of claim 1 in which said elements are contained in the following approximate amounts expressed in weight percent:

| Element | Approximate Composition, Weight % |
| --- | --- |
| Chromium | About 35.5 |
| Nickel | About 11.0 |
| Wolfram | About 5.8 |
| Tantalum | About 2.5 |
| Zirconium | About 0.20 |
| Silicon | About 0.10 |
| Carbon | About 0.74 |
| Boron | About 0.01 |
| Hafnium | About 0.7 |
| Aluminum | 0.0 to about 0.2 |
| Titanium | 0.0 to about 0.2 |
| Manganese | 0.0 to about 0.01 |
| Molybdenum | 0.0 to about 0.1 |
| Iron | 0.0 to about 1.0 |
| Cobalt | Balance | the weight ratio of wolfram to tantalum being about 2.3, and the weight ratio of zirconium to boron being about 20.

4. An article of manufacture produced by casting the composition of matter defined by claim 1.

5. An article of manufacture produced by casting the composition of matter defined by claim 2.

6. An article of manufacture produced by casting the composition of matter defined by claim 3.

7. A spinner for forming glass fibers from molten glass comprising an apertured wall formed from a high-strength alloy consisting essentially of the following elements in approximate amounts expressed in weight percent:

| Element | Approximate Composition, Weight % |
| --- | --- |
| Chromium | About 34.0 to about 38.0 |
| Nickel | About 10.0 to about 15.0 |
| Wolfram | About 4.0 to about 7.0 |
| Tantalum | About 2.0 to about 5.0 |
| Zirconium | About 0.1 to about 0.4 |
| Silicon | Present but about 0.15 max. |
| Carbon | About 0.65 to about 0.95 |
| Boron | About 0.005 to about 0.02 |
| Hafnium | About 0.4 to about 1.0 |
| Aluminum | 0.0 to about 0.2 |
| Titanium | 0.0 to about 0.2 |
| Manganese | 0.0 to about 0.05 |
| Molybdenum | 0.0 to about 0.1 |
| Iron | 0.0 to about 2.0 |
| Cobalt | Balance | and further that:

$$32 \geq \% \text{Cr} - 3.5[\% \text{C} - (\% \text{Ta} + \% \text{Zr} + \% \text{Hf} + \% \text{Ti})], \quad (1)$$

and $$2.74 \geq 4.66\left(\frac{\% \text{Cr}}{100}\right) + 0.61\left(\frac{\% \text{Ni}}{100}\right) + \\ 1.71\left(\frac{\% \text{Co}}{100}\right) + 4.66\left(\frac{\% \text{W}}{100}\right) + 2.22\left(\frac{\% \text{Fe}}{100}\right) + \\ 4.66\left(\frac{\% \text{Mo}}{100}\right) + 6.66\left(\frac{\% \text{Si}}{100}\right) + 6.66\left(\frac{\% \text{Ti}}{100}\right) + \\ 7.66\left(\frac{\% \text{Al}}{100}\right) + 3.66\left(\frac{\% \text{Mn}}{100}\right) \quad (2)$$

said percents of the elements in equation Nos. 1 and 2 each being atom percent.

8. The spinner of claim 7 in which said alloy consist essentially of the following elements in approximate amounts expressed in weight percent:

| Element | Approximate Composition, Weight % |
| --- | --- |
| Chromium | About 35.0 to about 36.0 |
| Nickel | About 10.7 to about 11.3 |
| Wolfram | About 5.5 to about 6.1 |
| Tantalum | About 2.2 to about 2.8 |
| Zirconium | About 0.17 to about 0.23 |
| Silicon | Present but about 0.13 max. |
| Carbon | About 0.70 to about 0.78 |
| Boron | About 0.008 to about 0.012 |
| Hafnium | About 0.60 to about 0.90 |
| Aluminum | 0.0 to about 0.2 |
| Titanium | 0.0 to about 0.2 |
| Manganese | 0.0 to about 0.01 |
| Molybdenum | 0.0 to about 0.1 |
| Iron | 0.0 to about 1.0 |
| Cobalt | Balance | the weight ratio of wolfram to tantalum being within the range of from about 2 to about 2.8, and the weight ratio of zirconium to boron being within the range of from about 14 to about 29.

9. The spinner for forming glass fibers from molten glass comprising an apertured wall formed from a high-strength alloy consisting essentially of the following elements in approximate amounts expressed in weight percent:

| Element | Approximate Composition, Weight % |
| --- | --- |
| Chromium | About 35.5 |
| Nickel | About 11.0 |
| Wolfram | About 5.8 |
| Tantalum | About 2.5 |
| Zirconium | About 0.20 |
| Silicon | About 0.10 |
| Carbon | About 0.74 |
| Boron | About 0.01 |
| Hafnium | About 0.7 |
| Aluminum | 0.0 to about 0.2 |
| Titanium | 0.0 to about 0.2 |
| Manganese | 0.0 to about 0.01 |
| Molybdenum | 0.0 to about 0.1 |
| Iron | 0.0 to about 1.0 |
| Cobalt | Balance | the weight ratio of wolfram to tantalum being about 2.3, and the weight ratio of zirconium to boron being about 20.

10. In a method of making mineral or glass fibers comprising passing molten material through a foraminous wall of a metal alloy spinner to form such fibers, the improvement wherein the spinner comprises an apertured wall formed from a high-strength alloy consisting essentially of the following elements in approximate amounts expressed in weight percent:

| Element | Approximate Composition, Weight % |
| --- | --- |
| Chromium | About 34.0 to about 38.0 |
| Nickel | About 10.0 to about 15.0 |
| Wolfram | About 4.0 to about 7.0 |
| Tantalum | About 2.0 to about 5.0 |
| Zirconium | About 0.1 to about 0.4 |
| Silicon | Present but about 0.15 max. |
| Carbon | About 0.65 to about 0.95 |
| Boron | About 0.005 to about 0.02 |
| Hafnium | About 0.4 to about 1.0 |
| Aluminum | 0.0 to about 0.2 |
| Titanium | 0.0 to about 0.2 |
| Manganese | 0.0 to about 0.05 |
| Molybdenum | 0.0 to about 0.1 |
| Iron | 0.0 to about 2.0 |
| Cobalt | Balance | and further that:

$$32 \geq \% \text{Cr} - 3.5[\% \text{C} - (\% \text{Ta} + \% \text{Zr} + \% \text{Hf} + \% \text{Ti})], \quad (1)$$

and $$2.74 \geq 4.66\left(\frac{\% \text{Cr}}{100}\right) + 0.61\left(\frac{\% \text{Ni}}{100}\right) + \quad (2)$$

$$1.71\left(\frac{\% \text{Co}}{100}\right) + 4.66\left(\frac{\% \text{W}}{100}\right) + 2.22\left(\frac{\% \text{Fe}}{100}\right) +$$

$$4.66\left(\frac{\% \text{Mo}}{100}\right) + 6.66\left(\frac{\% \text{Si}}{100}\right) + 6.66\left(\frac{\% \text{Ti}}{100}\right) +$$

$$7.66\left(\frac{\% \text{Al}}{100}\right) + 3.66\left(\frac{\% \text{Mn}}{100}\right)$$

said percents of the elements in equation Nos. 1 and 2 each being atom percent.

11. In a method according to claim 10 in which said alloy of said spinner consists essentially of the following elements in approximate amounts expressed in weight percent:

| Element | Approximate Composition, Weight % |
| --- | --- |
| Chromium | About 35.0 to about 36.0 |
| Nickel | About 10.7 to about 11.3 |
| Wolfram | About 5.5 to about 6.1 |
| Tantalum | About 2.2 to about 2.8 |
| Zirconium | About 0.17 to about 0.23 |
| Silicon | Present but about 0.13 max. |
| Carbon | About 0.70 to about 0.78 |
| Boron | About 0.008 to about 0.012 |
| Hafnium | About 0.60 to about 0.90 |
| Aluminum | 0.0 to about 0.2 |
| Titanium | 0.0 to about 0.2 |
| Molybdenum | 0.0 to about 0.1 |
| Iron | 0.0 to about 1.0 |
| Manganese | 0.0 to about 0.01 |
| Cobalt | Balance | the weight ratio of wolfram to tantalum being within the range of from about 2 to about 2.8, and the weight ratio of zirconium to boron being within the range of from about 14 to about 29.

12. In a method according to claim 10 in which said alloy of said spinner consists essentially of the following elements in approximate amounts expressed in weight percent:

| Element | Approximate Composition, Weight % |
| --- | --- |
| Chromium | About 35.5 |
| Nickel | About 11.0 |
| Wolfram | About 5.8 |
| Tantalum | About 2.5 |
| Zirconium | About 0.20 |
| Silicon | About 0.10 |
| Carbon | About 0.74 |
| Boron | About 0.01 |
| Hafnium | About 0.7 |
| Aluminum | 0.0 to about 0.2 |
| Titanium | 0.0 to about 0.2 |
| Molybdenum | 0.0 to about 0.1 |
| Iron | 0.0 to about 1.0 |
| Manganese | 0.0 to about 0.01 |
| Cobalt | Balance | the weight ratio of wolfram to tantalum being about 2.3, and the weight ratio of zirconium to boron being about 20.

13. As a composition of matter a glass corrosion resistant, high-strength alloy consisting essentially of the following elements in approximate amounts expressed in weight percent:

| Element | Approximate Composition, Weight % |
| --- | --- |
| Chromium | About 34.0 to about 38.0 |
| Nickel | About 10.0 to about 15.0 |
| Wolfram | About 4.0 to about 7.0 |
| Tantalum | About 2.0 to about 5.0 |
| Zirconium | About 0.1 to about 0.4 |
| Silicon | Present but about 0.15 max. |
| Carbon | About 0.65 to about 0.95 |
| Boron | About 0.005 to about 0.02 |
| Hafnium | About 0.4 to about 1.0 |
| Cobalt | Balance | and further that:

$$32 \geq \% \text{Cr} - 3.5[\% \text{C} - (\% \text{Ta} + \% \text{Zr} + \% \text{Hf} + \% \text{Ti})], \quad (1)$$

and $$2.74 \geq 4.66\left(\frac{\% \text{Cr}}{100}\right) + 0.61\left(\frac{\% \text{Ni}}{100}\right) + \quad (2)$$

$$1.71\left(\frac{\% \text{Co}}{100}\right) + 4.66\left(\frac{\% \text{W}}{100}\right) + 2.22\left(\frac{\% \text{Fe}}{100}\right) +$$

$$4.66\left(\frac{\% \text{Mo}}{100}\right) + 6.66\left(\frac{\% \text{Si}}{100}\right) + 6.66\left(\frac{\% \text{Ti}}{100}\right) +$$

$$7.66\left(\frac{\% \text{Al}}{100}\right) + 3.66\left(\frac{\% \text{Mn}}{100}\right)$$

said percents of the elements in equation Nos. 1 and 2 each being atom percent.

14. A spinner for forming glass fibers from molten glass comprising an apertured wall formed from a high-strength alloy consisting essentially of the following elements in approximate amounts expressed in weight percent:

| Element | Approximate Composition, Weight % |
|---|---|
| Chromium | About 34.0 to about 38.0 |
| Nickel | About 10.0 to about 15.0 |
| Wolfram | About 4.0 to about 7.0 |
| Tantalum | About 2.0 to about 5.0 |
| Zirconium | About 0.1 to about 0.4 |
| Silicon | Present but about 0.15 max. |
| Carbon | About 0.65 to about 0.95 |
| Boron | About 0.005 to about 0.02 |
| Hafnium | About 0.4 to about 1.0 |
| Cobalt | Balance | and further that:

$$32 \geq \% \text{Cr} - 3.5[\% \text{C} - (\% \text{Ta} + \% \text{Zr} + \% \text{Hf} + \% \text{Ti})], \quad (1)$$

and $$2.74 \geq 4.66\left(\frac{\% \text{Cr}}{100}\right) + 0.61\left(\frac{\% \text{Ni}}{100}\right) + \quad (2)$$

$$1.71\left(\frac{\% \text{Co}}{100}\right) + 4.66\left(\frac{\% \text{W}}{100}\right) + 2.22\left(\frac{\% \text{Fe}}{100}\right) +$$

$$4.66\left(\frac{\% \text{Mo}}{100}\right) + 6.66\left(\frac{\% \text{Si}}{100}\right) + 6.66\left(\frac{\% \text{Ti}}{100}\right) +$$

$$7.66\left(\frac{\% \text{Al}}{100}\right) + 3.66\left(\frac{\% \text{Mn}}{100}\right)$$

said percents of the elements in equation Nos. 1 and 2 each being atom percent.

15. In a method of making mineral or glass fibers comprising passing molten material through a foraminous wall of a metal alloy spinner to form such fibers, the improvement wherein the spinner wall is formed from a high-strength alloy consisting essentially of the following elements in approximate amounts expressed in weight percent:

| Element | Approximate Composition, Weight % |
|---|---|
| Chromium | About 34.0 to about 38.0 |
| Nickel | About 10.0 to about 15.0 |
| Wolfram | About 4.0 to about 7.0 |
| Tantalum | About 2.0 to about 5.0 |
| Zirconium | About 0.1 to about 0.4 |
| Silicon | Present but about 0.15 max. |
| Carbon | About 0.65 to about 0.95 |
| Boron | About 0.005 to about 0.02 |
| Hafnium | About 0.4 to about 1.0 |
| Cobalt | Balance | and further that:

$$32 \geq \% \text{Cr} - 3.5[\% \text{C} - (\% \text{Ta} + \% \text{Zr} + \% \text{Hf} + \% \text{Ti})], \quad (1)$$

and $$2.74 \geq 4.66\left(\frac{\% \text{Cr}}{100}\right) + 0.61\left(\frac{\% \text{Ni}}{100}\right) + \quad (2)$$

$$1.71\left(\frac{\% \text{Co}}{100}\right) + 4.66\left(\frac{\% \text{W}}{100}\right) + 2.22\left(\frac{\% \text{Fe}}{100}\right) +$$

$$4.66\left(\frac{\% \text{Mo}}{100}\right) + 6.66\left(\frac{\% \text{Si}}{100}\right) + 6.66\left(\frac{\% \text{Ti}}{100}\right) +$$

$$7.66\left(\frac{\% \text{Al}}{100}\right) + 3.66\left(\frac{\% \text{Mn}}{100}\right)$$

said percents of the elements in equation Nos. 1 and 2 each being atom percent.

* * * * *